Patented May 3, 1927.

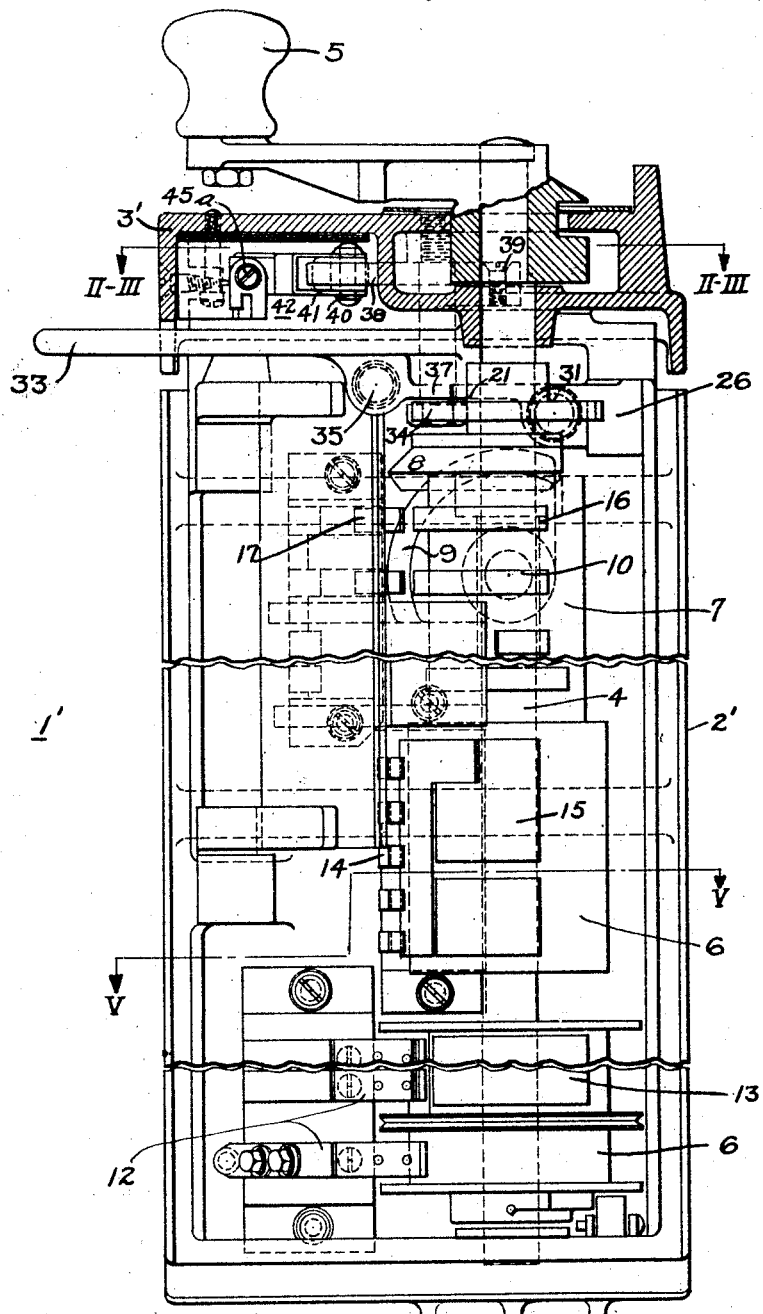
Fig. I.

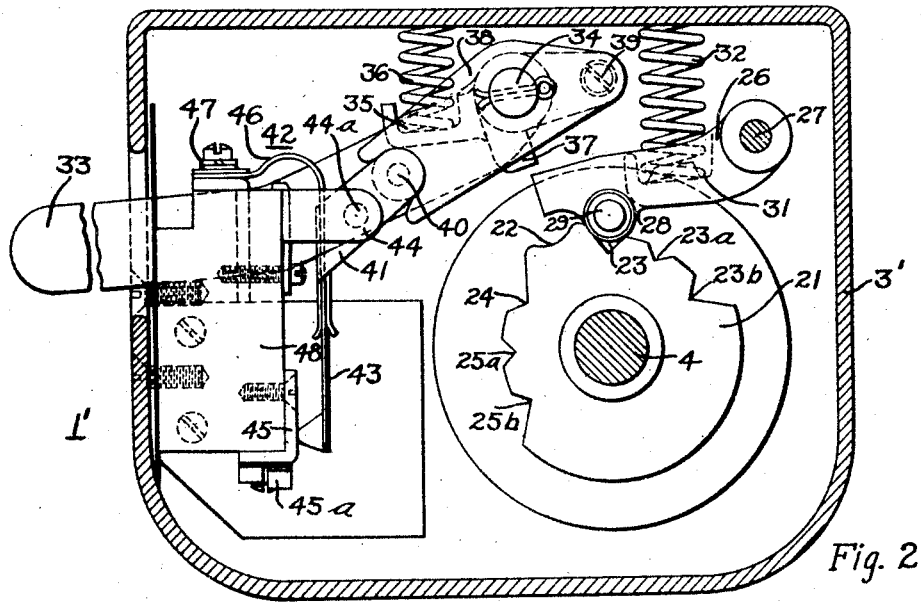
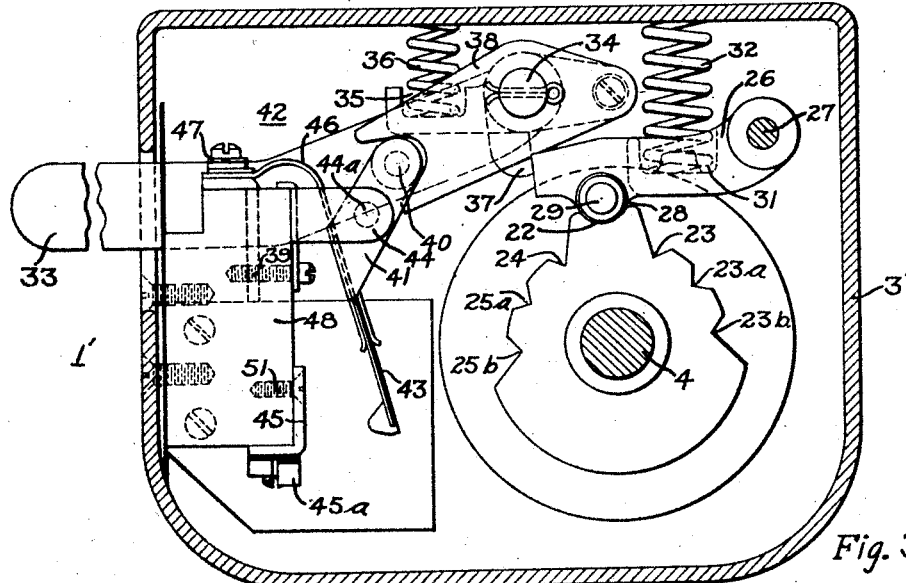
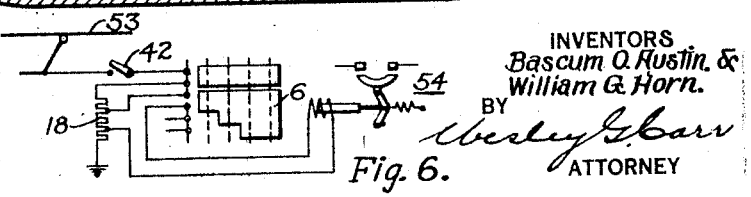

1,626,659

UNITED STATES PATENT OFFICE.

BASCUM O. AUSTIN, OF WILKINSBURG, AND WILLIAM G. HORN, OF BRYN MAWR FARMS, PENNSYLVANIA, ASSIGNORS TO WESTINGHOUSE ELECTRIC & MANUFACTURING COMPANY, A CORPORATION OF PENNSYLVANIA.

CONTROL APPARATUS.

Application filed May 24, 1921. Serial No. 472,190.

Our invention relates to control apparatus and systems and it has particular relation to controllers for governing the operation of relatively complicated control systems, such, for example, as those employed in electric cars, and the like.

One object of our invention is to provide an improved controller which shall be relatively simple and rugged in construction and economical and effective in operation.

Another object of our invention is to prevent a controller from being actuated through certain positions while the control system that it governs is energized, thereby preventing the establishment of short-circuits or severe arcing at contact members that are not designed to be subjected to heavy-current interruptions.

Briefly speaking, our invention consists in providing a controller shaft with a cam member, locating a switching device or relay that governs the energization of the control system adjacent to the controller shaft and providing means for preventing the switching device and the controller shaft from occupying certain positions simultaneously.

For a better understanding of our invention, reference may be made to the accompanying drawings, Figure 1 of which is a view, in side elevation, of a controller constructed in accordance with our invention;

Figs. 2 and 3 are detail views, partly in cross section, taken along the line II—II of Fig. 1;

Fig. 6 is a diagrammatic view of a portion of a control system employing our invention.

Figure 4:
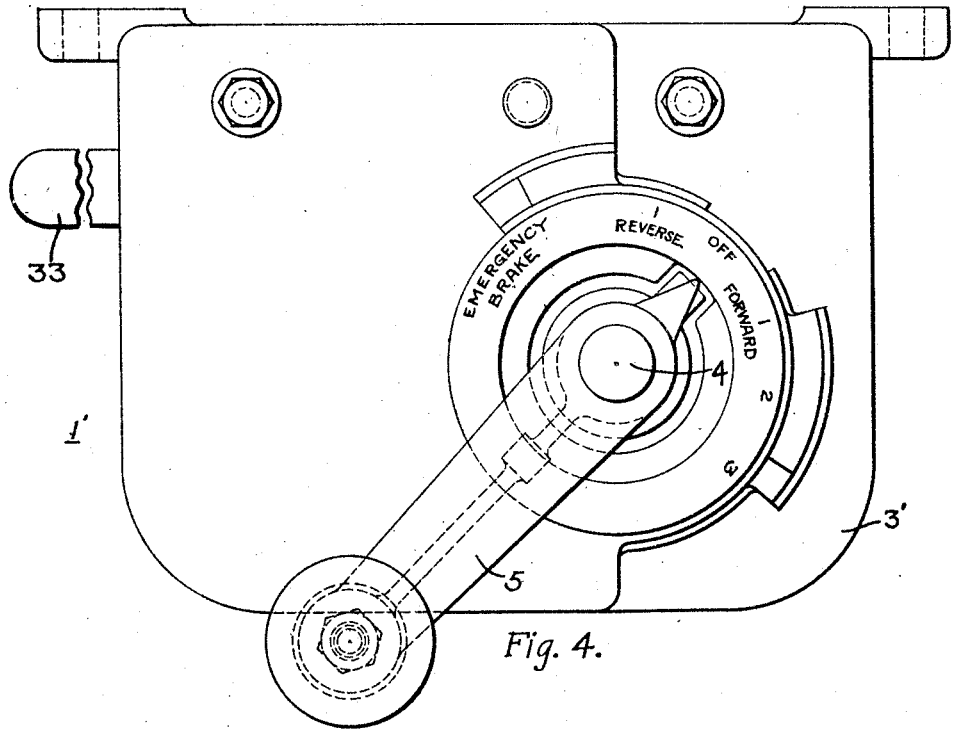
Fig. 4 is a view, in end elevation, of the controller shown in Fig. 1.
Figure 5:
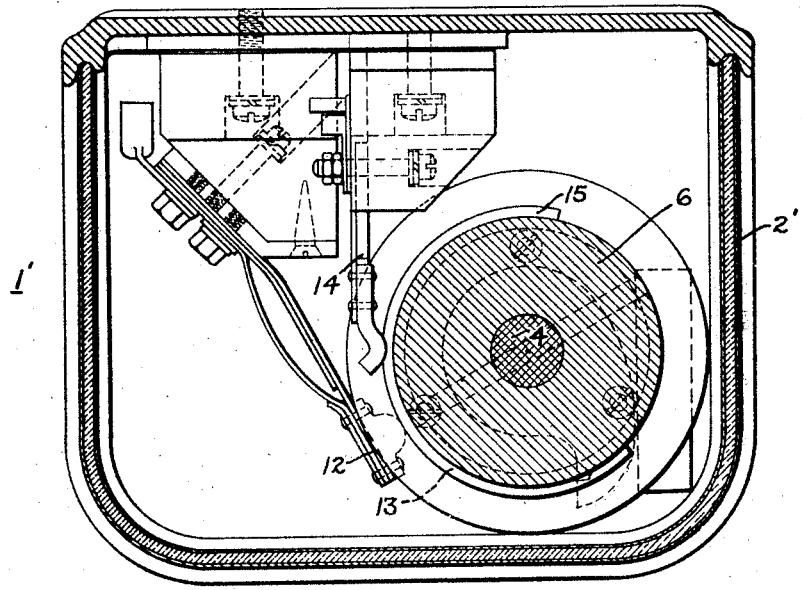
Fig. 5 is a cross-sectional view taken along the line V—V of Fig. 1.

Referring particularly to Fig. 1, a controller 1′ comprises a casing 2′, a cover member 3′, a shaft 4 and a handle 5 for actuating the shaft 4. A reversing drum 6 is securely mounted upon the shaft 4 to be actuated thereby, and a foot drum 7 is rotatably mounted upon the shaft 4 to be actuated by a gear-wheel 8 forming part of the drum 7. The gear-wheel 8 may be actuated by a segmental gear member 9 that is mounted upon a shaft 10, which, in turn, may be actuated by a foot mechanism (not shown).

A plurality of contact fingers 12 are provided for engaging contact segments 13 which are mounted upon the reversing drum 6. The contact fingers 12 are adapted to be electrically connected to the actuating coils of the reversing switches (not shown) for the control system.

A plurality of contact fingers 14 are arranged to engage a plurality of contact segments 15 which are also mounted upon the reversing drum 6. The contact fingers 14 are adapted to be connected to a plurality of series and parallel contactors (not shown) of the control system which are adapted to change the connections of a plurality of motors from series to parallel relation.

The foot drum 7 is provided with a plurality of contact segments 16 which are adapted to engage a plurality of contact fingers 17. The contact fingers 17 are electrically connected to the auxiliary control resistor 18 which is shown in Fig. 6.

Referring to Fig. 4 of the drawing, the handle 5 may be actuated from a central "off" position to a plurality of operating positions 1, 2 and 3, respectively, corresponding to the series connections of the car motors with all the starting resistance in circuit therewith, full speed series connections of the motors and full-running parallel connections of the motors.

The controller handle 5 may be actuated in a reverse direction to effect reverse operation of the motors and may be still further actuated in a reverse direction to effect emergency dynamic braking.

Referring to Figs. 1, 2 and 3 of the drawing, a cam member 21 is securely mounted upon the shaft 4 and is provided with a plurality of indentations 22, 23, 23ª, 23ᵇ, 24 and 25 corresponding to the "off" position, the several series and parallel positions, the reverse position and the dynamic-braking positions, respectively, that may be occupied by the controller handle 5, as illustrated in Fig. 4 of the drawing. A position-accentuating pawl member 26 is pivotally mounted upon a stud 27 and is provided with a projection 28 upon which a rotatable annular member 29 is adapted to engage the cam member 21 and to position itself in the indentations 22, 23, 23ª, 23ᵇ, 24 and 25. The pawl member 26 is provided with a cavity 31 in which one end of a resilient member 32 is positioned to maintain the member 26 in engagement with the cam member 21.

The sides of the indentations 22, 23, 24 and 25 are so inclined, that, upon the controller shaft 4 being actuated, the cam member 21 forces the rotatable annular member 29 and the pawl 26, upon which it is mounted, outwardly, to thereby permit further movement of the shaft 4. The pawl member 26 tends to bias the shaft 4 to whatever operating position the operator has actuated the handle 5.

A pivotally mounted lever or locking member 33 is mounted upon a bolt 34 and has its one end projecting out of the controller 1'. The locking member 33 is provided with a cavity 35 in which a resilient member 36 is mounted to bias the member 33 to the position shown in Fig. 2 of the drawing.

The locking member 33 is provided with a lug or projection 37. When the locking member 33 is in the position shown in Fig. 2, the outward movement of the pawl member 26 is limited to prevent angular movement of the cam member 21 past the central or "off" position of the controller 1'. However, movement of the controller shaft 4 is permitted so long as the handle 5 does not pass through the "off" position.

A separate irregularly-shaped rigid member or arm 38 is mounted upon the bolt 34 and is secured to the locking member 33, by means of a screw 39, to be actuated thereby. The member 38 engages a pin 40 which is mounted upon a movable member 41 forming part of a switching device 42, thereby actuating a contact finger 43.

The member 41 is pivotally mounted upon a stationary member or lug 44 by means of a pin 44ª. The contact finger 43 engages a stationary contact member 45 which is provided with a contact terminal 45ª. The contact finger 43 is provided with a flexible conductor 46 to electrically connect it with a stationary contact terminal 47. The stationary member 44 and the stationary contact segment 45 are suitably secured to the insulating block 48.

The operation of the switching device 42 will be described in connection with the operation of the master controller 1. Before the master controller 1 can be actuated to its "off" position, it is necessary that the locking member 33 be actuated to the position shown in Fig. 3, thereby permitting the pawl member 26 to be actuated past the lug 37. The pawl member 26 will be actuated outwardly by the movement of the cam member 21 until it occupies the position shown in Fig. 3 of the drawing.

When the cam member 21 is in this position, the switching device 42 must occupy its open position, thereby breaking a circuit illustrated in Fig. 6 of the drawings from a trolley 53 through switching device 42, foot drum 7, auxiliary control resistor 18. series-parallel drum 6 and the actuating coil of the circuit-breaker or line switch 54, thereby permitting the line switch 54 to assume its open position and thus de-energize the control system comprising the controller 1'.

It will be impossible to close the switching device 42 so long as the handle 5 is in the "off" position, as the cam member 21, cooperating with the pawl member 26, maintains the latching member 26 in its outer position, shown in Fig. 3 of the drawing, thereby preventing the lug 37 from rotating past the latching member 26 and thus preventing the locking member 33 from returning to the position in Fig. 2.

When the controller 1 is actuated to either side of the "off" position, the pawl member 26 is actuated toward the shaft 4 by the resilient member 32, whereupon the resilient member 36 returns the locking member 33 to the position shown in Fig. 2, thereby bringing the contact finger 43 into engagement with the contact segment 45.

From the above description, it is apparent that we have provided an effective and positive means of preventing the actuation of a controller to its "off" position until after a line switch has opened and have made it impossible to close the line switch so long as the controller is in the "off" position. We have also provided means for yieldingly maintaining the controller in whatever position it has been actuated by the operator.

While we have shown our invention in a preferred form, it is apparent that minor modifications may be made in the structural details and the arrangement of parts, such as in the place at which the switching device is positioned in the control system, without departing from the spirit of our invention. We desire, therefore, to be limited only by the scope of the appended claims.

We claim as our invention:

1. In a controller, in combination, a switch-operating drum, means adapted to retain said drum in different positions, a main switch, means for actuating said main switch, means operated by said actuating means cooperative to limit the movement of said drum when the main switch is closed, said drum-retaining means being adapted, when in a predetermined position, to lock the main switch against operation.

2. In a controller, in combination, a switch-operating drum, means adapted to retain said drum in different positions, a main switch, means for actuating said main switch, means operated by said actuating means cooperative to limit the movement of said drum when the main switch is closed, said drum-retaining means being adapted, when in a predetermined position, to lock the main switch against operation, and resilient means disposed to urge continuously the main switch to closed position, thereby to effect its operation when released.

3. In a controller, in combination, a switch-operating drum, means adapted to retain said drum in different positions, a main switch, means for actuating said main switch, means operated by said actuating means cooperative to limit the movement of said drum when the main switch is closed, and resilient means disposed to urge continuously the main switch toward its closed position, thereby to effect the closure of said main switch when released from said drum.

4. In a controller, in combination, a main switch, means for actuating the main switch, a switch-operating drum, a cam carried by the drum, means disposed to engage the cam to retain the drum in different positions, said cam being adapted, when in a predetermined position, to effect the locking of the main switch-actuating means against operation.

5. In a controller, the combination with a shaft, of a cam member secured to said shaft, a pawl member for engaging said cam member, resilient means for maintaining said pawl member in engagement with said cam member, a locking member for limiting the movement of said pawl member away from said cam member, and a switching device adjacent to said shaft and actuated by said locking member.

6. In a controller, the combination with a shaft, of a cam member secured to said shaft, a pawl member for engaging said cam member, resilient means for maintaining said pawl member in engagement with said cam member, a locking member for limiting the movement of said pawl member away from said cam member, a switching device adjacent to said shaft and actuated by said locking member, and resilient means for biasing said locking member to a predetermined position.

In testimony whereof, we have hereunto subscribed our names this 10th day of May, 1921.

BASCUM O. AUSTIN.
WILLIAM G. HORN.